(12) United States Patent
Armstrong, III et al.

(10) Patent No.: US 11,261,331 B2
(45) Date of Patent: Mar. 1, 2022

(54) NATURAL RUBBER SKIM BLOCK IN ASPHALT COMPOSITIONS AND NON-ASPHALT SOLVENT-BASED COATINGS

(71) Applicant: Corrie MacColl North America, Norfolk, VA (US)

(72) Inventors: Rodney G. Armstrong, III, Cuyahoga Falls, OH (US); Christopher D. Shepherd, Brecksville, OH (US); Tom Marsh, Sarasota, FL (US)

(73) Assignee: Corrie Maccoll North America, Norfolk, VA (US)

( * ) Notice: Subject to any disclaimer, the term of this patent is extended or adjusted under 35 U.S.C. 154(b) by 92 days.

(21) Appl. No.: 16/688,308

(22) Filed: Nov. 19, 2019

(65) Prior Publication Data

US 2021/0147687 A1   May 20, 2021

(51) Int. Cl.
*C08L 95/00*   (2006.01)
*C09D 195/00*   (2006.01)

(52) U.S. Cl.
CPC .......... *C08L 95/00* (2013.01); *C09D 195/00* (2013.01); *C08L 2201/56* (2013.01); *C08L 2205/03* (2013.01); *C08L 2205/08* (2013.01); *C08L 2555/74* (2013.01); *C08L 2555/84* (2013.01)

(58) Field of Classification Search
CPC .. C08L 95/00; C08L 2201/56; C08L 2205/03; C08L 2205/08; C08L 2555/74; C08L 2555/84; C09D 195/00

USPC .......................................................... 524/59
See application file for complete search history.

(56) References Cited

FOREIGN PATENT DOCUMENTS

JP          2013199619 A   * 10/2013

OTHER PUBLICATIONS

Boochathum, "Chapter 18: Rheological Behaviour of Natural Rubber Based Blends," RSC Polymer Chemistry Series No. 7, Natural Rubber Materials, vol. 1: Blends and IPNs, Royal Society of Chemistry, p. 394. (Year: 2014).*
Azahar et al., An Overview of Natural Rubber Application for Asphalt Modification, Int'l. J. Agric., Forestry, Plantation, vol. 2 (ISSN 2462-1757). (Year: 2016).*
Bristow, G.M., "Composition and Cure Behavior of Skim Block Natural Rubber," J. nat. Rubb. Res., 5(2), 114-134. (Year: 1990).*
JP 2013-199619 A, machine translation, EPO espacenet. (Year: 2013).*

* cited by examiner

*Primary Examiner* — Josephine L Chang
(74) *Attorney, Agent, or Firm* — Renner Kenner Greive Bobak Taylor & Weber

(57) ABSTRACT

A skim block composition includes a carrier mixed with a skim block addition, the skim block addition including from 0 to less than 100 wt % synthetic polymer, and from greater than 0 to 100% skim block. This provides productive use for the typical waste product skim block, which is the neutralized and coagulated product of skim latex formed during the production of natural rubber latex concentrate by centrifugation.

25 Claims, No Drawings

NATURAL RUBBER SKIM BLOCK IN ASPHALT COMPOSITIONS AND NON-ASPHALT SOLVENT-BASED COATINGS

FIELD OF THE INVENTION

The present invention generally resides in the art of asphalt compositions and in some embodiments non-asphalt solvent-based coatings, and, more particularly, is directed to the use of natural rubber skim block in asphalt compositions and solvent-based coatings. In one or more embodiments, the invention is directed to the use of natural rubber skim block in asphalt compositions and solvent-based coatings that include synthetic polymer additions, and the natural rubber skim block replaces at least a part of the synthetic polymer additions. In particular embodiments, the present invention is employed in the arts of aggregate binders for paving applications, hot applied asphalt joint and crack sealants, asphalt based roofing materials, asphalt cutback adhesives, and non-asphalt solvent-based coatings.

BACKGROUND OF THE INVENTION

It is a well-known practice to modify asphalt compositions and non-asphalt solvent based coatings with some type of viscoelastic material such as synthetic polymers. Currently asphalt compositions such as aggregate binders for paving applications, hot applied asphalt joint and crack sealants, solvent-based asphalt coatings, asphalt based roofing materials, and asphalt cutback adhesives as well a non-asphalt solvent-based coatings and the like are modified with synthetic polymers, most commonly styrene copolymers, such as SBS (styrene-butadiene-styrene), SBR (styrene-butadiene-rubber), SIS (styrene-isoprene-styrene), and others know in the art. Asphalt compositions would benefit from the use of less expensive modifiers that could be used in place of some or all of such synthetic polymers.

Natural rubber skim block, generally also known as skim block or skim block rubber (and also so called herein), is for the purposes of this disclosure to be understood as the neutralized and coagulated product of skim latex formed during the production of natural rubber latex concentrate by centrifugation. After centrifugation of natural rubber latex, a low percentage (approx. 5 to 10%) of the total rubber remains in the serum phase along with a higher proportion (as compared to the latex concentrate being formed) of non-rubber constituents, and is known as "skim latex." This skim latex is neutralized and coagulated (for example with sulfuric acid) to form skim block. Currently, the creation of skim block helps to manage and store this generally undesired waste portion of the centrifugation process. However, the uses are minimal, and the art would benefit from being able to beneficially employ skim block in compositions to not only provide useful compositions but also reduce the overabundance of skim block currently being stored at natural rubber and latex processing facilities.

SUMMARY OF THE INVENTION

The present invention shows that skim block can be employed to replace some or all of the higher priced synthetic polymers currently employed in asphalt compositions and non-asphalt solvent based coatings, and can thus reduce the cost of end compositions while also providing a use for skim block so as to reduce the overabundance of skim block currently being stored at natural rubber and latex processing facilities.

A first embodiment provides a skim block composition comprising: a carrier mixed with a skim block addition, the skim block addition including from 0 to less than 100 wt % synthetic polymer, and from greater than 0 to 100% skim block.

A second embodiment provides a skim block as in any preceding embodiment, wherein the skim block addition includes from 0 to about 98 wt % synthetic polymer and from about 2 to 100 wt % skim block.

A third embodiment provides a skim block as in any preceding embodiment, comprising from 0 to about 95 wt % synthetic polymer and from about 5 to 100 wt % skim block.

A fourth embodiment provides a skim block as in any preceding embodiment, comprising from 0% to about 90% synthetic polymer and from about 10% to 100% skim block.

A fifth embodiment provides a skim block as in any preceding embodiment, wherein the skim block addition includes from 0 to about 85 wt % synthetic polymer and from about 15 to 100 wt % skim block.

A sixth embodiment provides a skim block as in any preceding embodiment, wherein the skim block addition includes from 0 to about 75 wt % synthetic polymer and from about 25 to 100 wt % skim block.

A seventh embodiment provides a skim block as in any preceding embodiment, wherein the skim block addition includes from 0 to about 67 wt % synthetic polymer and from about 33 to 100 wt % skim block.

An eighth embodiment provides a skim block as in any preceding embodiment, wherein the skim block addition includes from 0 to about 50 wt % synthetic polymer and from about 50 to 100 wt % skim block.

A ninth embodiment provides a skim block as in any preceding embodiment, devoid of synthetic polymer.

A tenth embodiment provides a skim block as in any preceding embodiment, wherein the skim block is characterized by a weight average molecular weight (Mw) of from about 250,000 to about 450,000.

An eleventh embodiment provides a skim block as in any preceding embodiment, wherein the skim block is characterized by having a Mooney viscosity (ML1+4) of from about 25 to about 45.

A twelfth embodiment provides a skim block as in any preceding embodiment, wherein the skim block is characterized by having a solution viscosity of from about 3,000 to about 7,000 cPs.

A thirteenth embodiment provides a skim block as in any preceding embodiment, comprising greater than 0 wt % synthetic polymer and wherein the synthetic polymer is selected from linear, branched, or coupled polymers including one or more of polydienes or polydiene copolymers with non-diene comonomers.

A fourteenth embodiment provides a skim block as in any preceding embodiment, wherein the carrier is asphalt.

A fifteenth embodiment provides a skim block as in any preceding embodiment, wherein the skim block composition is selected from aggregate binders, hot applied asphalt joint and crack sealants, solvent-based asphalt coatings, asphalt based roofing materials, and asphalt cutback adhesives.

A sixteenth embodiment provides a skim block as in any preceding embodiment, wherein the skim block composition is an aggregate binder including from about 2 to about 6 wt % skim block addition and from about 94 to about 98 wt % asphalt.

A seventeenth embodiment provides a skim block as in any preceding embodiment, wherein the skim block composition is a solvent-based asphalt coating including from about 5 to about 15 wt % skim block addition and from about 50 to about 65 wt % asphalt.

An eighteenth embodiment provides a skim block as in any preceding embodiment, wherein the skim block composition is an asphalt cutback adhesive including from about 5 to about 15 wt % skim block addition and from about 50 to about 65 wt % asphalt.

A nineteenth embodiment provides a skim block as in any preceding embodiment, wherein the skim block composition is a hot applied asphalt and roofing material including from about 5 to about 15 wt % skim block addition and from about 50 to about 70 wt % asphalt.

A twentieth embodiment provides a skim block as in any preceding embodiment, the skim block composition of claim 15, wherein the skim block composition is a hot applied asphalt joint and crack sealant including skim block and synthetic polymer at a weight ratio of from about 2:3 to about 2:5.

A twenty-first embodiment provides a skim block as in any preceding embodiment, the skim block composition of claim 15, wherein the skim block composition is a hot applied asphalt joint and crack sealant having about 55 to about 65 wt % asphalt, from about 4 to about 6 wt % skim block, and from about 8 to about 12 wt % synthetic polymer.

A twenty-second embodiment provides a skim block as in any preceding embodiment, the skim block composition of claim 15, wherein the skim block composition is a hot applied asphalt joint and crack sealant including about 55 to about 65 wt % asphalt, from about 10 to about 14 wt % extender oil, from 0 to about 2 wt % wax, from about 8 to about 12 wt % synthetic polymer, from about 4 to about 6 wt % skim block, from about 0.5 to about 1.5 wt % adhesion promoter, and from about 10 to about 14 wt % inorganic fillers.

A twenty-third embodiment provides a skim block as in any preceding embodiment, the skim block composition of claim 15, wherein the skim block composition is a hot applied asphalt joint and crack sealant including about 60 wt % asphalt, about 12 wt % extender oil, about 10 wt % synthetic polymer, about 5 wt % skim block, about 1 wt % adhesion promoter, and about 12 wt % inorganic fillers.

A twenty-fourth embodiment provides a skim block as in any preceding embodiment, wherein the carrier is solvent, the skim block composition is devoid of asphalt, and the skim block composition is a non-asphalt solvent based coating including from about 5 to about 40 weight % skim block addition and from about 20 to about 60 weight % solvent A twenty-fifth embodiment provides an additive for a skim block liquid additive for asphalt modification comprising skim block is dissolved in heavy aromatic oil.

DETAILED DESCRIPTION OF ILLUSTRATIVE EMBODIMENTS

The present invention provides asphalt compositions and non-asphalt solvent based coatings employing skim block as an addition. In some embodiments, the skim block at least partially replaces synthetic polymer additions typically employed in such asphalt compositions and solvent-based coatings. In some embodiments, the present invention employs skim block as an addition in compositions selected from aggregate binders for paving applications, hot applied asphalt joint and crack sealants, solvent-based asphalt coatings, asphalt based roofing materials, asphalt cutback adhesives, and non-asphalt solvent-based coatings. In some embodiments, the solvent-based coatings are roofing coatings and below grade waterproofing.

To tie these inventions together conceptually, they are referred to herein as "skim block compositions," and consist of a carrier and a skim block addition. In asphalt compositions taught herein, the carrier is asphalt, and, in non-asphalt solvent based coatings taught herein, the carrier is a solvent.

In the asphalt compositions of this invention, the term "asphalt" (also known as "asphalt binder") is used as understood by those skilled in the art and is to be understood to cover both viscosity graded asphalt and performance graded asphalt as consistent with the definitions provided by at least ASTM D3381/D3381M-09a (viscosity graded), AASHTO M320 (performance graded) and Strategic Highway Research Program (SHRP).

In this invention, the asphalt material may be derived from any asphalt source, such as natural asphalt, rock asphalt, produced from tar sands, or petroleum asphalt obtained in the process of refining petroleum. In other embodiments, the asphalt may be a blend of various asphalts. Various non-limiting examples include airblown asphalt, vacuum-distilled asphalt, steam-distilled asphalt, cutback asphalt, and roofing asphalt. The term "asphalt" as used herein is to be understood to include gilsonite, whether natural or synthetic, and such can be used alone or mixed with petroleum asphalt.

In some embodiments, the asphalt can be characterized by its four fractions of saturates, naphthene aromatics, polar aromatics (or resins), and asphaltenes, and the percentage of these constituents in the asphalt component of this invention may vary based on the source of the asphalt. Virtually any asphalt can be employed in this invention.

In the non-asphalt solvent based coatings, the solvent is selected from, but not limited to aromatic solvents. In some embodiments, the solvent is selected from naptha, toluene, and xylene and mixtures thereof.

The compositions include what is generally referred to herein as a skim block addition, but in the case of non-asphalt solvent-based coatings, can be more particularly referred to as a skim block binder. The skim block addition will include skim block and, in some embodiments, can be entirely skim block. However, when not 100% skim block, the skim block addition will include other synthetic polymers.

In non-asphalt solvent-based coatings, there is no asphalt, but a primary component of non-asphalt solvent-based coating is a viscoelastic addition (also known as "binder"), which is dissolved in an aromatic solvent. Thus, the skim block addition can be reference more particularly as a skim block binder when employed in non-asphalt solvent-based coatings.

In both the asphalt compositions and the non-asphalt solvent based coatings, useful products are created by employing skim block as a replacement for at least a portion of, and, in some embodiments, all of the synthetic polymer mixed into the asphalt compositions or employed as binder in the solvent-based coatings. Thus the disclosure of synthetic polymer additions herein provides not only those additions that can be employed in the present invention, but also identifies those that could, in some embodiments, be fully replaced. Broadly, such synthetic polymers include one or more of thermoplastic polymers, thermosetting elastomers, and thermoplastic elastomers. By "one or more of" it is simply meant that a given asphalt composition/solvent-based coating may have multiple types of synthetic polymers mixed therein, as generally known and practiced. All such synthetic polymers have been employed to modify asphalt for various asphalt compositions or to serve as binders for non-asphalt solvent-based coatings in the prior art, and the present invention is not necessarily limited to the selection of any particular synthetic polymer for use or for full or partial replacement by skim block. The skim block is used as a replacement for some or all of the commonly used synthetic polymer in the various compounds (aggregate binder, crack filler, etc) disclosed here.

In some embodiments, the present invention provides asphalt compositions having a skim block addition comprising from 0 to less than 100 wt % synthetic polymer and from greater than 0 to 100 wt % skim block. In some embodiments, the present invention provides asphalt compositions having a skim block addition comprising from 0 to about 98 wt % synthetic polymer and from about 2 to 100 wt % skim block, in some embodiments, from 0 to about 95 wt % synthetic polymer and from about 5 to 100 wt % skim block, in some embodiments, from 0% to about 90% synthetic polymer and from about 10 to 100 wt % skim block, in some embodiments, from 0 to about 85 wt % synthetic polymer and from about 15 to 100 wt % skim block, in some embodiments, from 0 to about 75 wt % synthetic polymer and from about 25 to 100 wt % skim block, in some embodiments, from 0 to about 67 wt % synthetic polymer and from about 33 to 100 wt % skim block, in some embodiments, from 0 to about 50 wt % synthetic polymer and from about 50 to 100 wt % skim block.

In some embodiments, the present invention provides non-asphalt solvent-based coatings having a skim block binder comprising from 0 to less than 100 wt % synthetic polymer and from greater than 0 to 100 wt % skim block. In some embodiments, the present invention provides non-asphalt solvent-based coatings having a skim block binder comprising from 0 to about 98 wt % synthetic polymer and from about 2 to 100 wt % skim block, in some embodiments, from 0 to about 95 wt % synthetic polymer and from about 5 to 100 wt % skim block, in some embodiments, from 0 to about 90 wt % synthetic polymer and from about 10 to 100 wt % skim block, in some embodiments, from 0 to about 85 wt % synthetic polymer and from about 15 to 100 wt % skim block, in some embodiments, from 0 to about 75 wt % synthetic polymer and from about 25 to 100 wt % skim block, in some embodiments, from 0 to about 67 wt % synthetic polymer and from about 33 to 100 wt % skim block, in some embodiments, from 0 to about 50 wt % synthetic polymer and from about 50 to 100 wt % skim block.

The synthetic polymer may be made of linear, branched, or coupled polymers. In some embodiments, the synthetic polymer includes polydienes or polydiene copolymers with non-diene comonomer (e.g. styrene). The copolymers may include block and random copolymers. The coupled polymers may include linearly coupled polymers (e.g. di-coupled polymers) or radially coupled polymers (e.g. tri-coupled or, tetra-coupled penta-coupled, hexa-coupled etc.). Exemplary polydienes include polybutadiene and polyisoprene. Exemplary copolymers may include random styrene-butadiene rubber, styrene-butadiene block copolymer, styrene-butadiene-styrene (SBS) block copolymer, random styrene-isoprene, styrene-isoprene block copolymer, styrene-isoprene-butadiene (SIBS) block copolymer, random styrene-isoprene-butadiene, and styrene-isoprene-styrene (SIS) block copolymer.

In the SBS synthetic polymers, the styrene content of these block copolymers may be from about 5 to about 60% by weight, in other embodiments, from about 10 to about 50% by weight, in other embodiments, from about 10 to about 40% by weight, and in other embodiments, from about 15 to about 35% by weight.

In some embodiments, the SBS synthetic polymer additions are characterized by a butadiene/styrene ratio of 70/30 (Calprene 411, Dynasol Group).

In particular embodiments, the synthetic polymer is selected to be one or more of styrene-butadiene copolymer (i.e., styrene-butadiene rubber), styrene-butadiene random block copolymer, SBS block copolymer, SEBS (Styrene-Ethylene-Butylene-Styrene, SIS (Styrene-Isoprene-Styrene). In some embodiments, the synthetic polymer is an SBS block copolymer. In some embodiments, the synthetic polymer is an SBS block copolymer having a bound styrene content of from about 25 to about 35%. In some embodiments, the synthetic polymer is an SBS block copolymer, for example, KTR-101™ (Kuhmo Petrochemical, Seoul, Korea). In some embodiments, the synthetic polymer is SB random-block copolymer, for example Solprene S1205™ (Dynasol, Mexico).

The skim block has been generally defined above in the background. In some embodiments virtually any skim block can be employed regardless of its source. In some embodiments, the skim block is a resultant waste product from natural rubber latex production from *Hevea brasiliensis* trees.

In some embodiments, the skim block is characterized by having a Mooney viscosity (ML1+4) of from 25 to 45. In some embodiments, the skim block is characterized by having a Mooney viscosity (ML1+8) of from about 25 to about 45.

In some embodiments, the skim block is characterized by having a solution viscosity of from about 3,000 to about 7,000 cPs (#4 spindle, 20 rpm, 12.5% skim block in 87.5% toluene).

In some embodiments, the skim block is characterized by one or more of a weight average molecular weight (Mw) of from about 250,000 to about 450,000. In some embodiments, the skim block is characterized by one or more of a weight average molecular weight (Mw) of from about 300,000 to about 400,000 In some embodiments, the skim block is characterized by one or more of a weight average molecular weight (Mw) of from about 325,000 to about 350,000. In some embodiments, the skim block is characterized by one or more of a weight average molecular weight (Mw) of from about 329,000 to about 343,000.

In some embodiments, the carrier is asphalt and the asphalt composition is an aggregate binder including from about 2 to about 6 wt % skim block addition and from about 94 to about 98% asphalt. In some embodiments, the aggregate binder will include sulfur, which is used to crosslink the polymer. Addition levels of 0.08-0.1% are typical for sulfur.

In some embodiments, the carrier is asphalt and the asphalt composition is a solvent-based asphalt coating including from about 5 to about 15 wt % skim block addition and from about 50 to about 65 wt % asphalt, with the remainder made of additional components as generally used in the art.

In some embodiments, the carrier is asphalt and the asphalt composition is an asphalt cutback adhesive including from about 5 to about 15 wt % skim block addition and from about 25 to about 65 wt % asphalt, with the remainder made of solvent and additional components as generally used in the art. In other embodiments, an asphalt cutback adhesive includes from about 5 to about 15 wt % skim block addition and from about 50 to about 65 wt % asphalt Of particular import is the solvent (typically mineral spirits), and, with the understanding that asphalt cutback adhesives typically include from about 30% to about 60 wt % asphalt and from about 30% to about 70 wt % solvent, in some embodiments, the asphalt cutback adhesives of this invention include 30 to 70 wt % solvent.

In some embodiments, the carrier is asphalt and the asphalt composition is a hot applied asphalt and roofing material including from about 5 to about 15 wt % skim block addition and from about 50 to about 70 wt % asphalt, with the remainder made of additional components as generally used in the art.

In some embodiments, the carrier is a solvent, and the skim block composition is a non-asphalt solvent based coating including from about 5 to about 40 wt % skim block addition and from about 20 to about 60 wt % solvent, with the remainder made of additional components as generally used in the art.

The primary components have been disclosed. It will be appreciated that completed asphalt compositions and non-asphalt solvent based coatings will include other common components known to those of ordinary skill in the art, and such components will be used in amounts similar to those commonly practiced. The use of the skim block addition may be found to alter some properties, particularly as the skim block portion of the skim block addition increases, because the skim block portion will not have the same properties as the synthetic polymer(s) it is fully or partially replacing. However, it has been found that, if necessary, acceptable products can be produced without undue experimentation by slight alterations in the amounts of the above primary component as well as the additional components disclosed herein below.

Aggregate binder products are comprised of asphalt and skim block addition, and, in some embodiments, sulfur in small amounts for crosslinking.

In addition to asphalt and skim block addition, as above, solvent based asphalt coating products can include one or more of naptha oils, waxes, and inorganic fillers.

In addition to asphalt and skim block addition, as above, asphalt cutback adhesive products can include one or more of inorganic fillers, UV stabilizers, heat stabilizers, water scavengers, surfactants, water scavengers, fibers, and solvent. Typically the solvent will be mineral spirits.

In addition to asphalt and skim block addition, as above, hot applied asphalt joint and crack sealant products and roofing material products can include one or more of oils, waxes, adhesion promoters, and inorganic fillers.

In addition to asphalt and skim block addition, as above, non-asphalt solvent based coating products can include one or more of oils, waxes, inorganic fillers (including clay filler), surfactants, solvent, UV stabilizers, and tints.

Oils may also be referred to as processing oils or extender oils. These oils typically include high-boiling point hydrocarbons. In some embodiments, the high-boiling point hydrocarbons have a flash point of greater than 300° F., in some embodiments, a flash point of greater than 400° F. Non-limiting examples of common oils include paraffinic oils, aromatic oils, naphthenic oils, vegetable oils, low PCA oils, including MES, TDAE, and SRAE, heavy naphthenic oils, and various synthetic oils such as, but not limited to, polybutene oils. As generally known, the oils is selected based upon its compatibility with the asphalt and/or polymer additions. The use in compositions herein would be through common known oils, in common amounts.

In some embodiment, waxes include paraffinic wax, polyethylene wax, and paraffin wax, and mixtures thereof. The wax is employed as common in the art to achieve various desired properties such as, by way of non-limiting example, harder product at low or room temperatures; higher softening point; and lower viscosity at higher temperatures. The use in compositions herein would be through common known waxes, in common amounts.

Adhesion promoters will be employed to improve the adhesion between the asphalt composition and a substrate to which the asphalt composition is applied. In some embodiments, the adhesion promoters create a permanent covalent bond.

In some embodiments, the adhesion promoters are selected from high molecular weight block copolymers, and fatty acid based surfactants. In some embodiments, the adhesion promoter for asphalt-based compositions is Redicote™ C-450 (Akzo Nobel, Netherlands). The use in compositions herein would be through common known adhesion promoters, in common amounts.

Inorganic fillers are typically added to serve as dispersed filler to decrease end product costs, though some fillers such as clay, serve to increase viscosity over time when mixed with a surfactant. In some embodiments, the inorganic fillers may be selected from calcium carbonate, glass, clay, and ground tire rubber (GTR). These are typically employed as a dispersed filler to decrease end product cost. The use in compositions herein would be through common known inorganic fillers, in common amounts.

Surfactants are employed to lower surface tension and increase compatibility between components, typically, in asphalt cutback adhesives. The use in compositions herein would be through common known surfactants, in common amounts.

Water scavengers are employed to remove moisture. In some embodiments, the water scavengers are selected from silanes, silicones, silica, and silane terminated polymers. The use in compositions herein would be through common known water scavengers, in common amounts.

Fibers would be used as generally known in the art and in similar amounts and for similar purposes, typically for strengthening and/or adding particular functional groups per functionalization of the fibers. The use in compositions herein would be through common known fibers, in common amounts.

UV stabilizers are used to stabilize against negative effects cause by ultraviolet radiation. The use in compositions herein would be through common known UV stabilizers, in common amounts.

The use in compositions herein would be through common known tints, in common amounts.

In some embodiments, the compositions herein may include one or more of antioxidants, flame retardants, crosslinkers (e.g., sulfur for aggregate binder), and antiozoneants, and others known to those of skill in the art. This listing does not preclude the use of other additions found to be useful or otherwise desired.

Crack sealant formulations vary widely depending upon manufacturer and depending upon the particular end use application for which they are intended. However, in general, crack sealants are composed of base asphalt (bitumen), polymer/rubber copolymers (e.g., styrene-butadiene-styrene copolymers), extender oils, and reinforcing fillers (calcium carbonate).

In some embodiments, the asphalt composition is a hot applied asphalt joint and crack sealant including skim block and synthetic polymer at a weight ratio of from about 2:3 to about 2:5. In some embodiments, the asphalt composition is a hot applied asphalt joint and crack sealant including skim block and synthetic polymer at weight ratio of about 1:3.

In some embodiments, the asphalt composition is a hot applied asphalt joint and crack sealant having from about 55 to about 65 weight % asphalt, from about 4 to about 6 weight % skim block, and from about 8 to about 12 weight % synthetic polymer. In some embodiments, the crack sealant includes about 55 to about 65 weight % asphalt, from about 10 to about 14 weight % extender oil, from 0 to about 2 weight % wax, from about 8 to about 12 weight % synthetic polymer, from about 4 to about 6 weight % skim block, from about 0.5 to about 1.5 weight % adhesion promoter, and from about 10 to about 14 weight % inorganic fillers. In some embodiments, the crack sealant includes about 60 weight % asphalt, about 12 weight % extender oil, 0 to about 2 weight % wax, about 10 weight % synthetic polymer, about 5 weight % skim block, about 1 weight % adhesion promoter, and about 12 weight % inorganic fillers.

The present invention also provides a skim block liquid additive for asphalt modification. In this invention, skim block is dissolved in heavy aromatic oils by mixing under heat, and the skim block stays in solution. Thus, the end result solution can be employed as a liquid additive for asphalt modification, particularly in asphalt compositions where such heavy aromatic oils are already employed, such as asphalt cutback, asphalt roofing adhesives, asphalt roofing compounds, asphalt crack fillers, non-asphalt based coatings, asphalt based coatings, and the like.

In some embodiments, the heavy aromatic oil is selected from naphthenic oil, toluene, and xylene.

In some embodiments, the skim block is dissolved in the solvent at a mass concentration of at least 5-20% by weight. In some embodiments, the skim block is dissolved in the solvent at a mass concentration of at least 5-20% by weight. Can you run a Molarity on the sample you made and extrapolate from there?

Instead of grinding/milling skim block and adding separately to a mixture of asphalt and solvent, the skim block liquid additive, which contains the solvent, could simply be added to asphalt. For example, asphalt cutback could be formed by adding the skim block liquid additive to asphalt rather than separately containing, storing, shipping, etc solvent and skim block and adding them as separate additions.

In light of the foregoing, it should be appreciated that the present invention significantly advances the art by providing a asphalt compositions and non-asphalt solvent based coatings that beneficially employ skim block and thus help to reduce skim block accumulation as a waste product of the production of natural rubber latex. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

Analysis of Skim block as a replacement for S1205 (Styrene Copolymer) in an ASTM D6690 Standard Specification for Joint and Crack Sealants, Hot Applied, for Concrete and Asphalt Pavements Type II crack filler application.

Procedure

Table 1 below provides the control and test mixture.

|  | % by Weight | | | | | | |
| --- | --- | --- | --- | --- | --- | --- | --- |
|  | Control | Batch 1 | Batch 2 | Batch 3 | Batch 4 | Batch 5 | Batch 6 |
| Asphalt (Marathon 64-22) | 60.00 | 60.00 | 65.00 | 65.00 | 60.00 | 60.00 | 60.00 |
| Oil (Hydrocal 100) | 19.00 | 19.00 | 14.00 | 12.00 | 10.00 | 12.00 | 12.00 |
| Wax | x | x | x | 2 | x | x | x |
| Styrene Copolymer (S1205) | 10.00 | x | x | x | x | x | x |
| Skim Block | x | 10.00 | 10.00 | 10.00 | 5.00 | 5.00 | 6.00 |
| SBS (KTR-101) | 10.00 | 10.00 | 10.00 | 10.00 | 10.00 | 10.00 | 10.00 |
| Wet Adhesion Promoter | 1.00 | 1.00 | 1.00 | 1.00 | 1.00 | 1.00 | 1.00 |
| CaCo3 | x | x | x | x | 14.00 | 12.00 | 11.00 |

The base asphalt was Marathon asphalt with a PG of 64-22. The base asphalt was heated to approximately 340° F. and put under agitation. Oil was added to the asphalt and, if used, wax.

The skim block was added next (except for in the Control, where styrene-butadiene random-block copolymer, Solprene 1205 (Dynasol, Mexico) as used). The skim block was characterized by a weight average molecular weight (Mw) of 384,800. The skim block was added to the mixture and mixed at a high shear (3500-5000 rpm) for approximately 1 hour or until the skim block was completely dispersed (this raised the temperature to 370-390° F.).

The synthetic polymer was added next. The synthetic polymer was KTR-101 (Kuhmo Petrochemical, Seoul, Korea) styrene/butadiene/styrene (SBS). The SBS was added and mixed at a high shear for approximately 1 hour or until completely dispersed.

Next, the wet adhesion promoter Redicote™ C-450 (Akzo Nobel, Netherlands) was added and mixed until dispersed.

Next, if used, the CaCo3 (calcium carbonate) inorganic fillers were added and mixed in at a low shear, if using a mill as the CaCo3 is very abrasive and can wear down the teeth of the mill. Once all mixing was complete the sample(s) were observed under a UV microscope to determine if the polymer additions were adequately dispersed in the asphalt.

Results regarding softening point, penetration, resilience, and the pass/fail of the bond type II test are provided in Table 2, below.

| | Requirements | Control | Batch 1 | Batch 2 | Batch 3 | Batch 4 | Batch 5 | Batch 6 |
|---|---|---|---|---|---|---|---|---|
| | | | | | Results | | | |
| Softening Point | >/=177° F. | 207° F. | 198° F. | 209° F. | 207.3° F. | 218.1° F. | 211.5° F. | 210.0° F. |
| Penetration | </=90 dmm | 63 dmm | 113 dmm | 89 dmm | 70 dmm | 50 dmm | 59 dmm | 52 dmm |
| Resilience | >/+60% | 64% | 53% | 49.30% | 30% | 70% | 60% | 50.7% |
| Bond Type II | Pass three cycles at −20° F. | Pass | Pass | X | X | Fail | 2 of 3 pass | X |

CONCLUSIONS

Batch 1 was created to determine if the skim block could be a direct replacement of the S1205, but the batch had too high of a penetration and low resilience. Thus, in Batch 2, less oil was added to lower the penetration and raise the softening point. This was successful, but resilience went down. Wax was added for Batch 3 to try and raise the resilience and lower the penetration, but it was found that while this did lower the penetration, the resiliency went down further, perhaps due to an incompatibility issue with the wax and skim block. This study does show the skim block contributes to poorer resilience, but this can be overcome by adjusting the formula and using less of the skim block. Batch 1 did however show great cold temperature properties when tested for bond. Batch 1 still had some tack when tested at −20° F., where the S1205 control batch did not. Batch 4, in which less skim block was used and the composition was bulked up with CaCO3, showed much improved resilience, however it did not pass bond. As compared to Batch 4, Batch 5 included an increased amount of oil and decreased amount of CaCO3, and met all the softening point, penetration, and resilience criteria, and 2 of 3 blocks passed the bond type II test. Batch 5 does pass ASTM D6690 Type I, and this shows that the skim block can be used as a viable additive to be used in asphalt modification for crack fillers and other asphalt-based products. The same can be concluded for solvent-based coatings, as the common factor is the replacement of all or a part of the common synthetic polymer addition in these various formulations.

Creation of Skim Block Liquid Additive

The skim block was placed in a jar containing Hydrocal 100 (heavy naphthenic oil), and upon heating to 100-200° F. The skim block went into solution and stayed in solution. Thus the skim block solution created can be stored for use as a liquid additive for asphalt modification.

A skim block liquid additive was created by mixing 10% by weight skim block in 90% by weight Hydrocal 100. This was allowed to sit for 7 days.

What is claimed is:

1. A skim block composition comprising:
    a carrier mixed with a skim block addition, the skim block addition including:
        from zero to less than 100 weight % synthetic polymer, and
        from greater than zero to 100 weight % skim block;
        wherein the skim block is formed as the neutralized and coagulated product of skim latex during the production of natural rubber latex concentrate by centrifugation, and wherein the skim block is characterized by a weight average molecular weight (Mw) of from about 250,000 to about 450,000.

2. The skim block composition of claim 1, wherein the skim block addition includes from zero to about 98 weight % synthetic polymer and from about 2 to 100 weight % skim block.

3. The skim block composition of claim 1, comprising from zero to about 95 weight % synthetic polymer and from about 5 to 100 weight % skim block.

4. The skim block composition of claim 1, wherein the skim block addition includes from zero to about 50 weight % synthetic polymer and from about 50 to 100 weight % skim block.

5. The skim block composition of claim 1, devoid of synthetic polymer.

6. The skim block composition of claim 1, wherein the skim block is characterized by having a Mooney viscosity (ML1+4) of from about 25 to about 45.

7. The skim block composition of claim 6, wherein the skim block is characterized by having a solution viscosity of from about 3,000 to about 7,000 cPs.

8. The skim block composition of claim 1, wherein the carrier is asphalt.

9. The skim block composition of claim 8, wherein the skim block composition is selected from aggregate binders, hot applied asphalt joint and crack sealants, solvent-based asphalt coatings, asphalt based roofing materials, and asphalt cutback adhesives.

10. The skim block composition of claim 9, wherein the skim block composition is an aggregate binder including from about 2 to about 6 weight % skim block addition and from about 94 to about 98 weight % asphalt.

11. The skim block composition of claim 9, wherein the skim block composition is a solvent-based asphalt coating including from about 5 to about 15 weight % skim block addition and from about 50 to about 65 weight % asphalt.

12. The skim block composition of claim 9, wherein the skim block composition is an asphalt cutback adhesive including from about 5 to about 15 weight % skim block addition, from about 25 to about 65 weight % asphalt.

13. The skim block composition of claim 9, wherein the skim block composition is a hot applied asphalt and roofing material including from about 5 to about 15 weight % skim block addition and from about 50 to about 70 weight % asphalt.

14. The skim block composition of claim 1, wherein the skim block composition is a hot applied asphalt joint and crack sealant including skim block and synthetic polymer at a weight ratio of from about 2:3 to about 2:5.

15. The skim block composition of claim 1, wherein the skim block composition is a hot applied asphalt joint and crack sealant having about 55 to about 65 weight % asphalt, from about 4 to about 6 weight % skim block, and from about 8 to about 12 weight % synthetic polymer.

16. The skim block composition of claim 1, wherein the skim block composition is a hot applied asphalt joint and crack sealant including about 60 weight % asphalt, about 12 weight % extender oil, about 10 weight % synthetic polymer, about 5 weight % skim block, about 1 weight % adhesion promoter, and about 12 weight % inorganic fillers.

17. The skim block composition of claim 1, wherein the carrier is solvent, the skim block composition is devoid of asphalt, and the skim block composition is a non-asphalt solvent based coating including from about 5 to about 40 weight % skim block addition and from about 20 to about 60 weight % solvent.

18. A skim block composition comprising:
a carrier mixed with a skim block addition, the skim block addition including:
from zero to less than 100 weight % synthetic polymer, and
from greater than zero to 100 weight % skim block; and
wherein the skim block is formed as the neutralized and coagulated product of skim latex during the production of natural rubber latex concentrate by centrifugation, and wherein the skim block is characterized by having a Mooney viscosity (ML1+4) of from about 25 to about 45.

19. A skim block composition comprising:
a carrier mixed with a skim block addition, the skim block addition including:
from zero to less than 100 weight % synthetic polymer, and
from greater than zero to 100 weight % skim block; and
wherein the skim block is formed as the neutralized and coagulated product of skim latex during the production of natural rubber latex concentrate by centrifugation, and wherein the skim block is characterized by having a solution viscosity of from about 3,000 to about 7,000 cPs.

20. The skim block composition of claim 19, wherein the skim block is characterized by a weight average molecular weight (Mw) of from about 250,000 to about 450,000.

21. A skim block composition comprising:
a carrier mixed with a skim block addition, the skim block addition including:
from greater than zero to less than 100 weight % synthetic polymer, and
from greater than zero to 100 weight % skim block; and
wherein the synthetic polymer is selected from linear, branched, or coupled polymers including one or more of polydienes or polydiene copolymers with non-diene comonomers and wherein the skim block is formed as the neutralized and coagulated product of skim latex during the production of natural rubber latex concentrate by centrifugation.

22. A skim block composition comprising:
a carrier mixed with a skim block addition, the skim block addition including:
from zero to less than 100 weight % synthetic polymer, and
from greater than zero to 100 weight % skim block;
wherein the skim block is formed as the neutralized and coagulated product of skim latex during the production of natural rubber latex concentrate by centrifugation;
wherein the carrier is asphalt; and
wherein the skim block composition is a hot applied asphalt joint and crack sealant including skim block and synthetic polymer at a weight ratio of from about 2:3 to about 2:5.

23. A skim block composition comprising:
a carrier mixed with a skim block addition, the skim block addition including:
synthetic polymer, and
skim block;
wherein the skim block is formed as the neutralized and coagulated product of skim latex during the production of natural rubber latex concentrate by centrifugation;
wherein the carrier is asphalt; and
wherein the skim block composition is a hot applied asphalt joint and crack sealant having about 55 to about 65 weight % asphalt, from about 4 to about 6 weight % skim block, and from about 8 to about 12 weight % synthetic polymer.

24. A skim block composition comprising:
a carrier mixed with a skim block addition, the skim block addition including:
synthetic polymer, and
skim block;
wherein the skim block is formed as the neutralized and coagulated product of skim latex during the production of natural rubber latex concentrate by centrifugation;
wherein the carrier is asphalt; and
wherein the skim block composition is a hot applied asphalt joint and crack sealant including about 55 to about 65 weight % asphalt, from about 10 to about 14 weight % extender oil, from zero to about 2 weight % wax, from about 8 to about 12 weight % synthetic polymer, from about 4 to about 6 weight % skim block, from about 0.5 to about 1.5 weight % adhesion promoter, and from about 10 to about 14 weight % inorganic fillers.

25. A skim block composition comprising:
a carrier mixed with a skim block addition, the skim block addition including:
synthetic polymer, and
skim block;
wherein the skim block is formed as the neutralized and coagulated product of skim latex during the production of natural rubber latex concentrate by centrifugation;
wherein the carrier is asphalt; and
wherein the skim block composition is a hot applied asphalt joint and crack sealant including about 60 weight % asphalt, about 12 weight % extender oil, about 10 weight % synthetic polymer, about 5 weight % skim block, about 1 weight % adhesion promoter, and about 12 weight % inorganic fillers.

* * * * *